US006503617B2

(12) United States Patent
Jacobsen et al.

(10) Patent No.: US 6,503,617 B2
(45) Date of Patent: *Jan. 7, 2003

(54) MULTILAYER FILM LAMINATES

(75) Inventors: Sven Jacobsen, Fallingbostel (DE); Christian Kuckertz, Olpe (DE); Rainer Brandt, Walsrode (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/854,784

(22) Filed: May 14, 2001

(65) Prior Publication Data

US 2002/0018891 A1 Feb. 14, 2002

(30) Foreign Application Priority Data

May 22, 2000 (DE) .......................................... 100 25 321

(51) Int. Cl.$^7$ ............................................... B32B 15/08
(52) U.S. Cl. ................. 428/336; 428/423.5; 428/424.8; 428/425.5; 428/425.8; 428/451; 428/458; 428/461; 428/463; 428/476.3; 428/477.7; 428/516; 428/520
(58) Field of Search ................................. 428/336, 451, 428/458, 461, 463, 476.3, 477.7, 516, 520, 425.5, 425.8, 423.5, 424.8

(56) References Cited

U.S. PATENT DOCUMENTS 5,100,720 A * 3/1992 Sawada et al. ............. 428/215
5,112,673 A * 5/1992 Sawada et al. ............. 428/216
5,230,948 A 7/1993 Preiss et al. ................ 428/213
6,194,054 B1 * 2/2001 Peiffer et al. ............... 428/141
6,265,038 B1 * 7/2001 Frisk ........................ 428/34.7

FOREIGN PATENT DOCUMENTS

DE 293 17 847 11/1998
EP 0 878 298 11/1998

OTHER PUBLICATIONS

Database WPI Section Ch, Week 199150 Derwent Publications Ltd., London, GB; Class A92, AN 1991–365057 XP002185816 & JP 03 244535 A(Hosokawa Yoko KK), Oct. 31, 1991.
Database WPI Section Ch, Week 199125 Derwent Publications Ltd., London, GB; Class A92, AN 1991–181927 XP002185817 & JP 03 110143 A(Toppan Printing Co LTD, Mar. 10, 1991.

* cited by examiner

Primary Examiner—D. S. Nakarani
(74) Attorney, Agent, or Firm—Norris McLaughlin & Marcus

(57) ABSTRACT

Described is a multilayer film laminate having at least three layers, and gas barrier properties. The multilayer film laminate comprises sequentially: (I) at least two first layers, each of the first layers (I) having, on one side only, a vapor deposited coating selected independently from the group consisting of aluminum, SiOx and a metal oxide of main group 2 or 3 of the periodic table of the elements; and (II) an exterior polyolefin heat sealing layer. Also described is a method of using the multilayer film laminate as a barrier film in vacuum insulation panels.

9 Claims, No Drawings

MULTILAYER FILM LAMINATES

CROSS REFERENCE TO RELATED PATENT APPLICATION

The present patent application claims the right of priority under 35 U.S.C. §119(a)–(d) of German Patent Application No. 100 25 321.0, filed May 22, 2000.

FIELD OF THE INVENTION

The present invention relates to multilayer film laminates, which are particularly impermeable to gas diffusion, and to the use of these gas diffusion impermeable multilayer film laminates in the production of vacuum insulation panels.

BACKGROUND OF THE INVENTION

In some specific industrial products, such as for example in the production of vacuum insulation panels (VIP), there is a requirement for films which have extremely low gas diffusion values, in order to ensure that, once applied, the vacuum and thus the effectiveness of the VIPs are retained over a very long period of time (e.g., 10–15 years).

Conventional barrier layer films made from plastics, as described for example in EP-A 0 517 026, do not achieve the necessary gas barrier action. While composites which contain aluminum foil can provide a complete gas barrier, they are undesirable in many applications due to the thermal conductivity of the aluminum. Metallised films or films with a vapor deposited SiOx coating are furthermore known which avoid the disadvantages with regard to the thermal conductivity of pure metal foils (for example, as described in EP-A 0 878 298) and simultaneously achieve higher levels of barrier action than do pure plastics films. However, the levels of barrier action obtained with films having vapor deposited SiOx coatings are still far below the required gas barrier values.

As used herein and in the claims, the term "vacuum insulation panels (VIPs)" means sheet-like structures which include an insulating material or packing, that are vacuum packed in a high barrier film envelope. The level of the vacuum are here determined by the insulating material or packing used and the required insulation action of the VIP. Over the service life of the VIP, the high barrier film prevents the diffusion of gases which impair the vacuum and thus the insulating properties of the VIP. Metal foils are undesirable as high barrier films as they conduct heat around the edges of the sheet-form VIP, so reducing insulation performance.

SUMMARY OF THE INVENTION

The object of the present invention is accordingly to provide film laminates which achieve particularly elevated gas barrier action without using thermally conductive metal foils as a component. It is simultaneously intended to have a positive influence upon further mechanical and thermal properties of the film laminate by means of a suitable combination of materials. In particular, the intention is to provide film laminates which are suitable for the production of vacuum insulation panels (VIP).

In accordance with the present invention, there is provided a multilayer film laminate comprising at least three layers having the following sequence:

(I) at least two first plastic layers (e.g., (Ia), (Ib), (Ic), etc.), each of said first layers (I) having, on one side only, a vapor deposited coating selected independently from the group consisting of aluminum, SiOx and a metal oxide of main group 2 or 3 of the periodic table of the elements; and (II) an exterior polyolefin heat sealing layer.

As used herein and in the claims, the term "SiOx" means silicon oxide, having x oxygen atoms, e.g., from 2 to n oxygen atoms.

As used herein and in the claims, the phrase "main group 2 or 3 of the periodic table of the elements" is meant to be inclusive of the elements Be, Mg, Ca, Sr, Ba, Al, Ga, In, Tl.

Unless otherwise indicated, all numbers expressing quantities of ingredients, reaction conditions, etc. used in the specification and claims are to be under stood as modified in all instance by the term "about."

DETAILED DESCRIPTION OF THE INVENTION

The initial expectation in this connection would be that gas barrier action is determined by the gas barrier action of the best of the individual layers or is calculated as the sum of the barrier actions of the individual layers, but, surprisingly, levels of gas barrier action are obtained which are not only distinctly higher than those of the individual layers but are in part distinctly higher than the sum of the individual layers. While not intending to be bound by any theory, this may, for example, be explained by supplementary (synergistic) coverage of defects in the individual vacuum deposit coated layers.

The vapor deposited coatings of each first film layer (I) of the multilayer film laminate of the present invention may be applied by art recognized methods.

In order to achieve still higher gas diffusion barrier values, further layers may be inserted or interposed between the layers of the multilayer film laminate of the present invention, e.g., between (Ia) and (Ib) and/or between (Ib) and (II). These additional layers may: (1) have, on one side only, a vapor deposited coating selected from aluminum, SiOx and a metal oxide of main group 2 or 3 of the periodic table of the elements; or (2) be free of a vapor deposited coating, while still having specific barrier properties, e.g., a layer of polyvinyl alcohol (PVOH) free of a vapor deposited coating.

The polymers of the layers of the multilayer film laminate of the present invention having a vapor deposited coating selected from aluminum, SiOx and a metal oxide of main group 2 or 3 may include any of the known conventional plastics, preferred examples of which include, but are not limited to polyesters, polyamides, polyolefins or the copolymers thereof. These layers having vapor deposited coatings may furthermore also be composed of coextruded plies of different polymers. The thickness of the individual layers is not essential in this connection, but will, to a small extent, influence gas barrier action and, furthermore, contribute to the mechanical and thermal properties of the multilayer film laminate of the present invention.

With the multilayer film laminates according to the invention, it is in particular possible to achieve oxygen diffusion values of less than 0.01 $cm^3/m^2$ d bar (determined at a temperature of 23° C., and at 75% relative humidity) and water vapor diffusion values of less than 0.1 $g/m^2$ d (determined at a temperature of 38° C., and at 90% relative humidity). When the multilayer film laminates are produced with more than 3 layers, it is entirely possible also to obtain multilayer film laminates which achieve distinctly lower gas diffusion values still. By means of the combination of the various plies, it is not only possible to adjust the gas diffusion values to the values required by the application, but it is also possible to vary the mechanical and/or thermal characteristics of the resultant multilayer film laminate according to the invention by modifying the layer material which is provided with a vapor deposited coating selected from aluminium, SiOx and a metal oxide of main group 2 or 3.

If one of the first layers (I) is an external polyamide layer, e.g., an external polyamide layer (Ia), with a vapor deposited coating on one side of aluminum or SiOx or a metal oxide of main group 2 or 3, the resultant multilayer film laminate is distinguished, in addition to the good gas diffusion barrier values, by elevated mechanical stability, and in particular by elevated puncture resistance, which offers advantages in handling the multilayer film laminates according to the invention, so preventing damage to the laminates and VIPs produced therefrom. Such VIPs typically must at times withstand considerable mechanical loads both during manufacture and during installation in the final application, which may result in damage to the film and thus impaired barrier properties.

In an embodiment of the present invention, one of the first layers (I) is an external polypropylene layer, e.g., an external polypropylene layer (Ia), with a vapor deposited coating on one side of aluminum or SiOx or a metal oxide of group 2 or 3, which is distinguished by particularly good water vapor barrier action. If this external layer is then combined with a subsequent layer (Ib), which is composed of a polyester with a vapor deposited coating on one side of aluminum or SiOx or a metal oxide of main group 2 or 3, which is in turn distinguished by particularly good oxygen barrier action, the resultant multilayer film laminate according to the invention will be distinguished both by better water vapor barrier action in comparison with the polypropylene layer alone, and by better oxygen barrier action in comparison with the polyester layer alone. The crucial barrier elements of the combined external polypropylene layer (Ia) and polyester layer (Ib) not only complement but synergistically support each other in a particularly convincing manner.

In another embodiment of the present invention, at least one of the layers with a vapor deposited coating of aluminium or SiOx or a metal oxide of main group 2 or 3 is a coextruded layer, in which the coextruded layer is produced from at least one ply of polyamide (a), and at least one gas barrier ply (b). One particularly desirable structure is a 3-ply combination of polyamide in the outer layers and a copolymer of ethylene/vinyl alcohol (EVOH) as a gas barrier layer in the inner ply interposed between two polyamide plies. In the resultant multilayer film laminate according to the invention, the gas barrier ply provides extremely improved gas barrier values, in particular improved oxygen barrier values when EVOH is used as the gas barrier ply.

In a particularly preferred embodiment of the multilayer film laminate of the present invention, two of the layers with a vapor deposited coating of aluminium or SiOx or a metal oxide of main group 2 or 3 are laminated together with the vapor deposited layers against or abutting each other (e.g., abutting each other directly, or each abutting a common adhesive layer interposed there-between). While not intending to be bound by any theory, it is believed that this provides particularly advantageous gas barrier values as the two abutting vapor deposited coatings directly complement each other, such that microscopic damage in one vapor deposited coating may be covered by the second vapor deposited coating, giving rise to a disproportionate increase in barrier properties.

In one particularly preferred structure, at least one of the first layers (I), e.g., at least one of layers (Ia), (Ib), (Ic), etc., is provided with a vapor deposited coating of aluminium, preferably having a thickness of 30 to 80 nm.

Polyolefin homo- or polyolefin copolymers may be used as the heat sealing layer (II). Examples of polyolefin homo- or polyolefin copolymers that may be used as the heat sealing layer (II) include, but are not limited, to: linear low density polyethylene (LLDPE); polybutylene (PB); ethylene/vinyl acetate (EVA); polypropylene (PP); high density polyethylene (HDPE); ionomer polymers (IO); and mixtures of these substances are preferred. Amorphous polyethylene terephthalate (aPET) or other heat sealable polymer materials may also be used as the heat sealable layer (II). A multilayer embodiment of the heat sealing layer (II) produced by coextruding two or more layers of the stated materials is also possible according to the invention. The thickness of the heat sealing layer (II) is preferably 20 to 200 $\mu$m, and particularly preferably 50 to 100 $\mu$m.

In particular, ionomer sealing layers or other easy flowing sealing layers, which give rise to particularly gas tight seams under the dusty conditions typical in VIP production, are preferably used as the heat sealing layer (II) when the multilayer film laminates of the present invention are used in the production of VIPs.

Conventional commercially available reactive adhesives, such as and in particular two component polyurethane adhesives, may be used as the adhesive and bonding layer between the individual layers of the multilayer film laminates of the present invention. It is, however, also possible to use polyolefin coupling agents, preferably polyethylene homopolymer, ethylene/ethyl acrylate (EEA) or ethylene/methacrylic acid (EMA) as an adhesive or bonding layer between the individual layers of the multilayer film laminate. However, the multilayer film laminate according to the invention, and in particular the gas barrier action thereof, does not essentially depend upon the nature of the bond between the individual layers.

When two component polyurethane adhesives are used as an adhesive bonding agent or layer between the individual layers of the multilayer film laminates of the present invention, care must typically be taken to ensure that the components of the two component polyurethane adhesives are selected such that a minimum evolution of gas occurs during the bonding process. Otherwise, gas bubbles may, undesirably, form in the bonding layers.

The present invention also provides a method of using the multilayer film laminates according to the invention in vacuum insulation panels.

Embodiments of multilayer film laminates according to the present invention are represented by the following sequential structures (A) through (H). These representative sequential multilayer film laminate structures are not intended to be restrictive of the scope of the present invention.

(A)
   (Ia) polyamide with a vapor deposited coating of aluminium, coated side facing towards (Ib)
   (Ib) polyester with a vapor deposited coating of aluminium, coated side facing towards (II)
   (II) polyethylene sealing layer (B)
   (Ia) polyester with a vapor deposited coating of aluminium, coated side facing towards (Ib)
   (Ib) polyester with a vapor deposited coating of aluminium, coated side facing towards (Ia)
   (II) polyethylene sealing layer (C)
- (Ia) polypropylene with a vapor deposited coating of aluminium, coated side facing towards (Ib)
- (Ib) polyester with a vapor deposited coating of aluminium, coated side facing towards (II)
- (II) polyethylene sealing layer (D)
- (Ia) polyamide with a vapor deposited coating of aluminium, coated side facing towards (Ib)
- (Ib) polypropylene with a vapor deposited coating of aluminium, coated side facing towards (Ia)
- (II) ionomer sealing layer (E)
- (Ia) polyamide/EVOH/polyamide 3-layer coextrudate with a vapor deposited coating of aluminium, coated side facing towards
- (Ib) polyester with a vapor deposited coating of aluminium, coated side facing towards (Ic)
- (Ic) polyester with a vapor deposited coating of aluminium, coated side facing towards (Ib)
- (II) amorphous polyethylene terephthalate sealing layer (F)
- (Ia) polyamide with a vapor deposited coating of aluminium, coated side facing towards (Ib)
- (Ib) polyester with a vapor deposited coating of aluminium, coated side facing towards (Ia)
- (Ic) polyester with a vapor deposited coating of aluminium, coated side facing towards (Id)
- (Id) polyester with a vapor deposited coating of aluminium, coated side facing towards (Ic)
- (II) polypropylene sealing layer (G)
- (Ia) polyamide with a vapor deposited coating of SiOx, coated side facing towards (Ib)
- (Ib) polyester with a vapor deposited coating of SiOx, coated side facing towards (II)
- (II) ionomer sealing layer (H)
- (Ia) polypropylene with a vapor deposited coating of SiOx, coated side facing towards (Ib)
- (Ib) polyester with a vapor deposited coating of aluminium, coated side facing towards (Ia)
- (II) polyethylene sealing layer Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multilayer film laminate comprising in sequence:
   (I) at least two first layers, each of said first layers (I) having on one side a vapor deposited coating selected independently from the group consisting of aluminum, silicon oxide and a metal oxide of main group 2 or 3 of the periodic table of the elements; and
   (II) an exterior polyolefin heat sealing layer, wherein at least one of said first layers (I) is a coextruded layer, in which the coextruded layer is produced from at least one ply of polyamide (a), and at least one EVOH gas barrier ply (b).

2. The multilayer film laminate of claim 1 wherein the multilayer film laminate comprises a total of 3 layers comprising two first layers (I), and one polyolefin heat sealing layer (II).

3. The multilayer film laminate of claim 1 wherein one of said first layers (I) is an external layer (Ia), the polymer of said external layer (Ia) being a polyamide.

4. The multilayer film laminate of claim 1 wherein one of said first layers (I) is an external layer (Ia), the polymer of said external layer (Ia) being polypropylene.

5. The multilayer film laminate of claim 1 wherein the vapor deposited coatings of at least two of said first layers (I) abut each other.

6. The multilayer film laminate of claim 1 wherein the individual layers of said multilayer film laminate are laminated together by means of two component polyurethane adhesives, in which the ratio of the adhesive components of the two component polyurethane adhesives is selected such as to minimize the quantities of gas liberated during curing of the two component polyurethane adhesives.

7. The multilayer film laminate of claim 1 wherein the vapor deposited coating of each of said first layers (I) is a vapor deposited coating of aluminum having a thickness of 30 to 80 nm.

8. The multilayer film laminate of claim 1 wherein one of said first layers (I) is an external layer (Ia), said external layer (Ia) having printing thereon.

9. A method of using the multilayer film laminate of claim 1 comprising:
   (i) providing the multilayer film of claim 1; and
   (ii) incorporating said multilayer film into a vacuum insulation panel as a barrier film.

* * * * *